US010019622B2

(12) United States Patent
Cao et al.

(10) Patent No.: US 10,019,622 B2
(45) Date of Patent: Jul. 10, 2018

(54) FACE ALIGNMENT WITH SHAPE REGRESSION

(71) Applicant: MICROSOFT TECHNOLOGY LICENSING, LLC, Redmond, WA (US)

(72) Inventors: Xudong Cao, Beijing (CN); Yichen Wei, Beijing (CN); Jian Sun, Beijing (CN); Shaoqing Ren, Anhui (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/522,366

(22) Filed: Oct. 23, 2014

(65) Prior Publication Data
US 2016/0055368 A1 Feb. 25, 2016

(30) Foreign Application Priority Data

Aug. 22, 2014 (WO) ................ PCT/CN2014/085007

(51) Int. Cl.
*G06K 9/46* (2006.01)
*G06K 9/00* (2006.01)
*G06K 9/62* (2006.01)

(52) U.S. Cl.
CPC ..... *G06K 9/00268* (2013.01); *G06K 9/00281* (2013.01); *G06K 9/00288* (2013.01);
(Continued)

(58) Field of Classification Search
CPC ........... G06K 9/00268; G06K 9/00288; G06K 9/6206; G06K 9/627; G06T 7/0028
See application file for complete search history.

(56) References Cited

U.S. PATENT DOCUMENTS

| 7,194,114 B2* | 3/2007 | Schneiderman ....... G06K 9/527 382/118 |
| 7,483,553 B2* | 1/2009 | Xu .......................... G06T 11/00 345/473 |

(Continued)

FOREIGN PATENT DOCUMENTS

| CN | 102637251 B | 10/2013 |
| CN | 103440510 A | 12/2013 |

(Continued)

OTHER PUBLICATIONS

Fishbaugh et al. "A framework for longitudinal data analysis via shape regression" Proc SPIE. Feb. 23, 2012; 8314: pp. 1-11.*

(Continued)

*Primary Examiner* — Iman K Kholdebarin (57) ABSTRACT

The subject matter described herein relates to face alignment via shape regression. A method, computer storage medium, and system are provided. In one embodiment, the method comprises receiving an image including a face; and performing shape regression to estimate a facial shape in the image. For each stage in the shape regression, a local feature is extracted from a local region around each facial landmark in the image independently; and a joint projection is performed based on local features of multiple facial landmarks to predict a facial shape increment. Then, a facial shape of a current stage is generated based on the predicted facial shape increment and a facial shape of a previous stage.

20 Claims, 7 Drawing Sheets

(52) U.S. Cl.
CPC .......... *G06K 9/6206* (2013.01); *G06K 9/627* (2013.01); *G06K 9/628* (2013.01); *G06K 9/6209* (2013.01); *G06K 9/6211* (2013.01); *G06K 2009/4666* (2013.01)

(56) References Cited

U.S. PATENT DOCUMENTS

| | | | |
|---|---|---|---|
| 7,688,199 B2* | 3/2010 | Zhang | A62C 3/08 340/506 |
| 7,848,548 B1* | 12/2010 | Moon | G06K 9/00281 382/100 |
| 7,899,253 B2* | 3/2011 | Porikli | G06K 9/00369 382/159 |
| 8,155,399 B2 | 4/2012 | Liu et al. | |
| 8,478,077 B2 | 7/2013 | Liu et al. | |
| 8,824,808 B2* | 9/2014 | Brandt | G06T 5/005 345/420 |
| 9,251,402 B2* | 2/2016 | Sun | G06K 9/00281 |
| 9,323,980 B2* | 4/2016 | Sun | G06K 9/00281 |
| 2002/0067362 A1* | 6/2002 | Agostino Nocera | G06K 9/00248 345/473 |
| 2004/0240711 A1* | 12/2004 | Hamza | G06K 9/00201 382/118 |
| 2005/0212821 A1* | 9/2005 | Xu | G06T 11/00 345/647 |
| 2006/0056687 A1* | 3/2006 | Brandt | G06K 9/00228 382/167 |
| 2006/0280341 A1* | 12/2006 | Koshizen | G06K 9/00221 382/118 |
| 2007/0041644 A1* | 2/2007 | Kim | G06K 9/00248 382/190 |
| 2007/0047775 A1* | 3/2007 | Okubo | G06K 9/00248 382/118 |
| 2007/0047838 A1* | 3/2007 | Milanfar | G06K 9/40 382/289 |
| 2007/0052698 A1* | 3/2007 | Funayama | G06T 7/0046 345/419 |
| 2007/0053660 A1* | 3/2007 | Abe | G06K 9/00228 386/241 |
| 2007/0172099 A1* | 7/2007 | Park | G06K 9/00281 382/118 |
| 2008/0085044 A1* | 4/2008 | Zhou | G06K 9/00 382/131 |
| 2008/0106437 A1* | 5/2008 | Zhang | A62C 3/08 340/945 |
| 2008/0152218 A1* | 6/2008 | Okada | G06K 9/00369 382/159 |
| 2008/0166026 A1 | 7/2008 | Huang et al. | |
| 2008/0187174 A1* | 8/2008 | Metaxas | G06K 9/00335 382/103 |
| 2009/0097772 A1* | 4/2009 | Zhao | G06K 9/6248 382/263 |
| 2010/0020208 A1* | 1/2010 | Barbu | G06K 9/40 348/250 |
| 2010/0030578 A1* | 2/2010 | Siddique | G06Q 10/0637 705/3 |
| 2010/0205177 A1* | 8/2010 | Sato | G06K 9/00281 707/737 |
| 2011/0010319 A1* | 1/2011 | Harada | G06F 17/30265 706/12 |
| 2011/0091113 A1* | 4/2011 | Ito | G06K 9/00248 382/197 |
| 2011/0135166 A1* | 6/2011 | Wechsler | G06K 9/00288 382/118 |
| 2012/0027292 A1* | 2/2012 | Kozakaya | G06T 7/75 382/154 |
| 2012/0308124 A1* | 12/2012 | Belhumeur | G06K 9/00281 382/159 |
| 2012/0321140 A1* | 12/2012 | Xiong | G06K 9/00228 382/108 |
| 2012/0321174 A1* | 12/2012 | Tsymbal | G06K 9/6263 382/159 |
| 2013/0022263 A1* | 1/2013 | Metaxas | G06K 9/00335 382/159 |
| 2013/0044958 A1* | 2/2013 | Brandt | G06K 9/00248 382/201 |
| 2013/0064472 A1* | 3/2013 | Zhang | G06T 3/4053 382/294 |
| 2013/0163831 A1* | 6/2013 | Tanaka | G06K 9/00926 382/118 |
| 2013/0223694 A1* | 8/2013 | Ricanek, Jr. | G06K 9/00221 382/118 |
| 2013/0276007 A1* | 10/2013 | Li | H04N 21/44218 725/12 |
| 2013/0308854 A1* | 11/2013 | Hosokawa | G06K 9/6256 382/159 |
| 2014/0003663 A1* | 1/2014 | Li | G06K 9/00281 382/103 |
| 2014/0047734 A1* | 2/2014 | Cao | G03F 7/38 34/486 |
| 2014/0089236 A1* | 3/2014 | Lee | G06K 9/6231 706/12 |
| 2014/0099029 A1* | 4/2014 | Savvides | G06K 9/481 382/197 |
| 2014/0185924 A1* | 7/2014 | Cao | G06K 9/00281 382/159 |
| 2014/0341443 A1* | 11/2014 | Cao | G06K 9/00288 382/118 |
| 2015/0169938 A1* | 6/2015 | Yao | G06K 9/00261 382/103 |
| 2016/0379041 A1* | 12/2016 | Rhee | G06K 9/00275 382/118 |

FOREIGN PATENT DOCUMENTS

| | | |
|---|---|---|
| CN | 103714331 A | 4/2014 |
| WO | 2014037709 A1 | 3/2014 |

OTHER PUBLICATIONS

Jegou et al. "Aggregating local descriptors into a compact image representation" Computer Vision and Pattern Recognition (CVPR), 2010 IEEE Conference on—Jun. 13-18, 2010, pp. 3304-3311.*

Yoshioka et al. "Fast Gaussian Process Regression unit Representative Data"—Neural Networks, 2001. Proceedings. IJCNN '01. International Joint Conference on, vol. 1, pp. 132-137 0.1, 2001.*

Shen et al. "Fast Gaussian Process Regression using KD-Trees" Advances in Neural Information Processing Systems (NIPS)—2005, pp. 1-8.*

Ojala, Tet al. "A Comparative Study of Texture Measures With Classification Based on Feature Distributions", PatternRecoonition, vol. 29, No. I, pp. 51 59, 1996.*

Zhang, et al., "Multi-view Facial Landmark Localization in RGB-D Images via Hierarchical Regression with Binary Patterns", In IEEE Transactions on Circuits and Systems for Video Technology, Issue 99, Feb. 26, 2014, 13 pages.

Bonnen, et al., "Component-Based Representation in Automated Face Recognition", In IEEE Transactions on Information Forensics and Security, vol. 8, Issue 1, Jan. 2013, 15 pages.

Lei, et al., "Discriminant Image Filter Learning for Face Recognition with Local Binary Pattern Like Representation", In IEEE Conference on Computer Vision and Pattern Recognition, Jun. 16, 2012, 6 pages.

"International Search Report and Written Opinion Issued in PCT Patent Application No. PCT/CN2014/085007", dated May 25, 2015, 13 Pages.

"Supplementary Search Report Issued in European Patent Application No. 14900073.9", dated Jul. 24, 2017, 3 Pages.

"Office Action Issued in European Patent Application No. 14900073.9", dated Aug. 7, 2017, 6 Pages.

(56) References Cited

OTHER PUBLICATIONS

Ren, et al., "Face Alignment at 3000 FPS via Regressing Local Binary Features", In the proceedings of the IEEE Conference on Computer Vision and Pattern Recognition, Jun. 23, 2014, pp. 1685-1692.

* cited by examiner

FACE ALIGNMENT WITH SHAPE REGRESSION

RELATED APPLICATIONS

This application claims priority to International Application No. PCT/CN2014/085007, filed on Aug. 22, 2014, and entitled "FACE ALIGNMENT WITH SHAPE REGRESSION." This application claims the benefit of the above-identified application, and the disclosure of the above-identified application is hereby incorporated by reference in its entirety as if set forth herein in full.

BACKGROUND

Face alignment or locating semantic facial landmarks such as eyes, nose, mouth and chin, plays a very fundamental role in face recognition or verification, face tracking, face animation, 3D face modeling, age, gender or race estimation, head pose estimation, expression analysis, and etc. The goal of face alignment is to match a two-dimensional or three-dimensional face shape or appearance within a facial image.

SUMMARY

It is to be understood that this Summary is provided to introduce a selection of concepts in a simplified form. The concepts are further described below in the Detailed Description. This Summary is not intended to identify key features or essential features of the claimed subject matters, nor is it intended to be used to limit the scope of the claimed subject matters.

Discriminative shape regression is one approach for accurate and robust face alignment. The shape regression approach predicts a facial shape in a cascaded manner. The facial shape can be represented by a multiple of facial landmarks, such as eyes, nose, mouth corners, chin, and other features. The facial shape is progressively refined by estimating a shape increment stage-by-stage.

Briefly, various aspects of the subject matter described herein are directed towards a technology by which facial landmarks (e.g., eyes, a nose, mouth corners and so on) in a facial image can be located through shape regression based on local features. In one aspect, for each stage of the shape regression, a local feature is extracted from a local region around each facial landmark independently. Then, a facial shape of a current stage can be determined at least based on the co-occurrence relationship or correlations among these local features.

Advantages may become apparent from the following detailed description when taken in conjunction with the drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

The goal of face alignment is to estimate a facial shape that is as close as possible to the true facial shape, i.e., reducing alignment errors as much as possible. According to how a facial shape is estimated, most facial alignment approaches can be classified into two categories: optimization-based and regression-based.

Optimization-based methods minimize another error that is correlated to the alignment error instead. Regression-based methods learn a regression function that directly maps image appearance to the target output. The complex variations in the regression function are learned from large training data and testing is usually efficient.

Various aspects of the technology described herein are generally directed towards face alignment with shape regression. The shape regression approach predicts a facial shape in a cascaded manner. The facial shape can be represented by a multiple of facial landmarks. More specifically, the facial shape can be expressed by locations of the multiple facial landmarks within a face. A facial landmark is a point of interest within a face. In other words, a facial landmark could be exemplified as one or more pixels of interest within a facial image made up of pixels. The left eye, right eye, nose, two corners of the mouth are all examples of landmarks.

While some of the examples described herein are directed towards certain facial landmarks or features, it is understood that these are only examples. For instance, other facial landmarks may be used, and not all of those that are exemplified need be used in a given implementation. As such, the present disclosure is not limited to any particular embodiments, aspects, concepts, structures, functionalities or examples described herein. Rather, any of the embodiments, aspects, concepts, structures, functionalities or examples described herein are non-limiting, and the present disclosure may be used in various ways that provide benefits and advantages in computing and image processing in general.

Generally, in the shape regression, a facial shape is predicted in a cascaded manner. Beginning with an initial facial shape, the shape regression method uses a regression function to estimate a shape increment from image features. The facial shape is then updated based on the shape increment and the initial facial shape. In turn, the updated facial shape is used for the estimation of a next stage of the shape regression. In this way, the facial shape is progressively refined stage-by-stage.

The regression function may be learned from large training data. In some shape regression approaches, the regression function is trained on the whole face region. The regression function can be expressed in many appropriate manners. In a generic form, the regression function can be expressed by the combination of a feature mapping function and a linear regression matrix. According to some existing shape regression approaches, the feature mapping function and the linear regression matrix are jointly learned by a tree-based regression, on the whole face region in a data-driven manner.

In such situation, a shape increment ΔS at stage t can be regressed as:

$$\Delta S^t = W^t \Phi^t(I, S^{t-1}), \quad (1)$$

where I is the input image, $S^{t-1}$ is the shape from the previous stage, $\Phi^t$ is a feature mapping function, and $W^t$ is a linear regression matrix. The regression goes to the next stage by adding the shape increment to the shape from the previous stage.

As mentioned above, in some conventional approaches, both the feature mapping function and the linear regression matrix are learned jointly on the whole face region.

However, such learning-based approach does not achieve expected performance by training with a task specific target. This may be due to two issues caused by the high freedom of the feature mapping function. The first is a practical issue. Using the entire face region as training input results in an extremely large feature pool which translates into unaffordable training cost if it is desirable to learn the most discriminative feature combination. The second is a generalization issue. As the majority in the feature pool is noisy, it is very likely that many irrelevant features will fit well in training but hurt the testing performance.

The disclosure herein proposes regularizing the learning with a "locality" principle. This locality principle is based on one or both of two insights: for locating a certain facial landmark at a stage, 1) the most discriminative texture information lies in a local region around the estimation from the previous stage; and 2) shape context (i.e., the co-occurrence relationship or correlations between this facial landmark and other facial landmarks) and local texture of this facial landmark provide sufficient information.

Based on this locality principle, at any stage of the shape regression, one embodiment first learns intrinsic features to extract the local texture for each facial landmark independently, and then estimate a facial shape for the current stage based on the local textures of multiple facial landmarks jointly to incorporate the shape context.

The technique for face alignment disclosed herein can be applied in many appropriate ways. For example, it can be used to identify an individual in a collection of pictures, to map a player's actual face onto an avatar during game play, to analyze the facial expression of an individual through an image, to log in a system or an application of an electronic device, to generate a cartoon character, or whatever other practical uses it might come up with.

Figure 1:
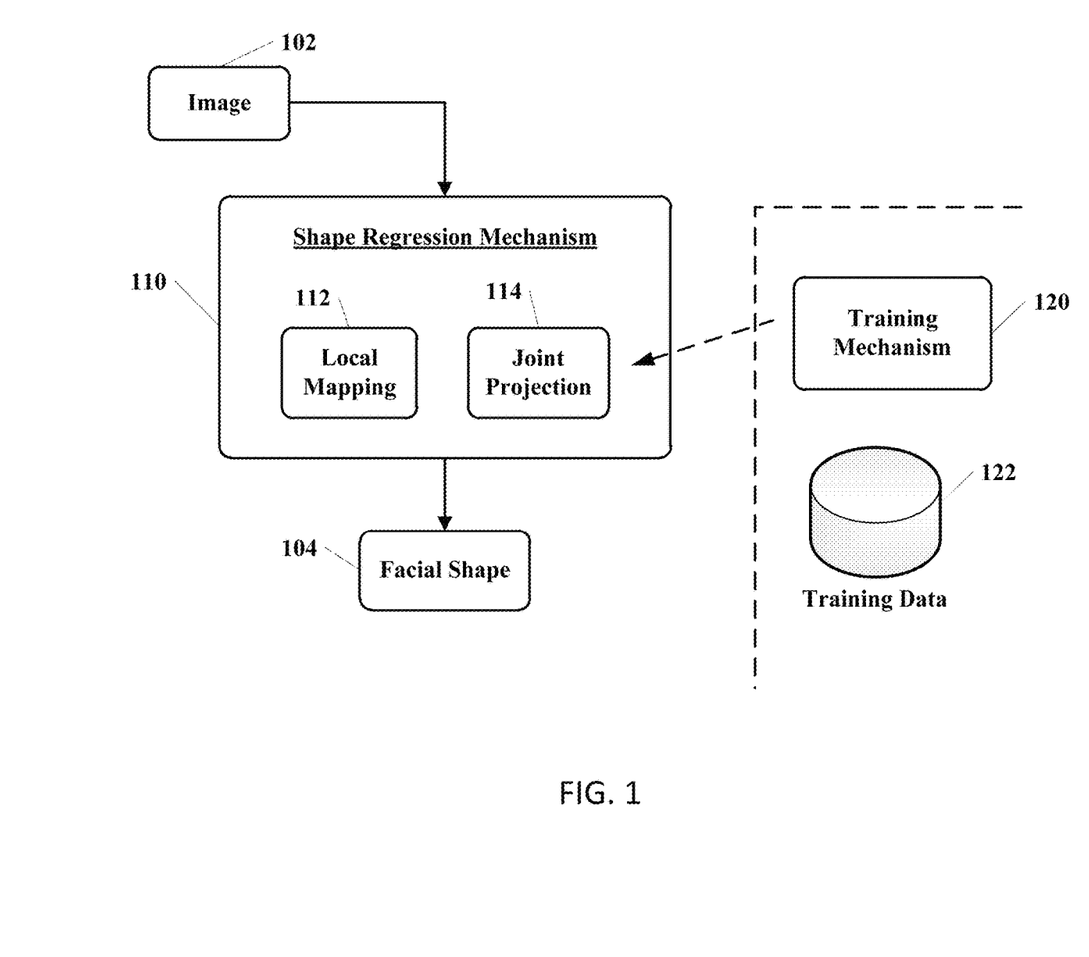
FIG. 1 is a block diagram showing example components for implementing face alignment via regressing local features.

Turning to FIG. 1, there is shown a general block diagram in which a shape regression mechanism 110 processes an image 102 to provide a facial shape 104 corresponding to a face within the image 102. In some embodiments, each stage of the shape regression mechanism 110 works with a local feature extracting or mapping 112 and a joint projection 114.

At any stage of the local feature extracting or mapping, a local feature of each desired facial landmark is extracted from a local region around the facial landmark. The extracting of the local feature from the local region in the image can be accomplished in many appropriate ways. One implementation of the local feature extracting or mapping is using a feature mapping function including a set of independent local feature mapping functions. Each local feature mapping function may be associated with a facial landmark and maps a local region of the image around the associated facial landmark to a local feature. One of ordinary skill in the art could appreciate that some other manners for extracting a local feature are also possible such as Local Binary Pattern (LBP), Scale Invariant Feature Transform (SIFT), and etc.

Then, at a corresponding stage of the joint projection, the extracted local features can be organized or associated and the correlation among them can be explored to estimate the facial shape for the current stage. The organization of the local features can be accomplished in many suitable ways. In one implementation, all the extracted local features can be organized together according to a global projection to predict an incremental facial shape at that stage. In another implementation, the local features can be divided into several groups (for example, two groups, each for a half of a face), and each group is associated with a joint projection. In yet another implementation, only some of the local features (for example, some salient feature, such as eyes, nose, mouth, etc.) are used for a joint projection.

For the purpose of illustration and simplicity, a local feature extracting or mapping with a set of independent local feature mapping functions and a joint projection based on all the extracted local features (also referred to as a global projection) will be used as an example for the shape regression hereinafter.

At stage t, in the local feature extracting or mapping 112, the feature mapping function $\Phi^t$ may be decomposed into a set of independent local feature mapping functions, i.e., $\Phi^t = [\phi_1^t, \phi_2^t, \ldots, \phi_L^t]$, where L is the number of facial landmarks. For the lth facial landmark, a local region around the lth facial landmark may be mapped to a local feature according to the local mapping function $\phi_l^t$, where $1 \leq l \leq L$.

Then, in the joint projection 114, in one embodiment, the local features of the L facial landmarks can be used for a global projection based on a global projection matrix $W^t$, to predict a facial shape increment at this stage t. The shape regression may go to the next stage t+1 by adding the shape increment to the shape from the previous stage.

The whole process is repeated stage-by-stage in a cascading fashion. Finally, after a certain number (e.g., a predetermined threshold in the range of 3 to 7 or more) of stages and/or meeting a certain condition (e.g., the facial shape increment is smaller than a predetermined threshold), a final facial shape 104 can be output.

The feature mapping function and the global projection matrix can be learned from training data 122. Similar to the shape regression mechanism 110 and according to the training mechanism 120, in one embodiment, the feature mapping function may be decomposed into a set of independent local feature mapping functions, i.e., $\Phi^t = \{\phi_l^t\}$. Each local feature mapping function can be learned by independently regressing each associated facial landmark, in a corresponding local region. Then, in one embodiment, a joint regression can be performed on all the facial landmarks to obtain the global projection matrix.

Figure 2:
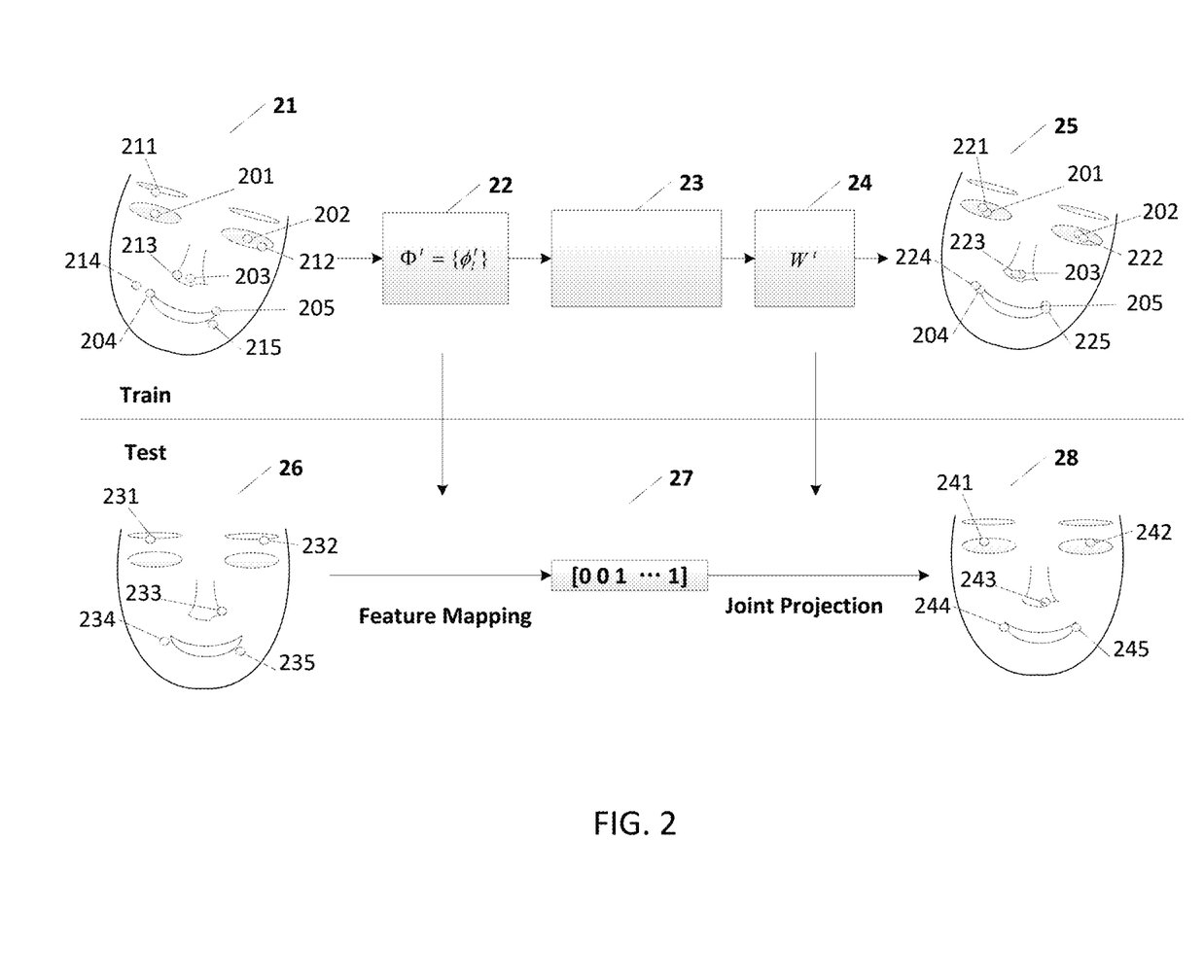
FIG. 2 is an overview of face alignment via regressing local features.

FIG. 2 provides an overview of face alignment via regressing local features. The upper part of FIG. 2 illustrates the training phase for any stage (e.g., stage t) of the shape regression, while the lower part of FIG. 2 illustrates the testing phase for a corresponding stage (i.e. stage t) of the shape regression.

As shown in FIG. 2, five facial landmarks (two eyes, nose, two corners of mouth) are used as an example for representing a facial shape. While some of the examples described herein are directed towards certain facial landmarks or features, it is understood that these are only examples. Additional or less facial landmarks may be used as appropriate. For instance, other facial landmarks may be used, and not all of those that are exemplified need be used in a given implementation. As such, the present disclosure is not limited to any particular embodiment described herein.

In the top-left picture 21 shown in FIG. 2, the dots 201, 202, 203, 204, and 205 denote the ground truth locations of the five facial landmarks, respectively. In this example, the locations of these five dots depict the ground truth facial shape. Other dots 211, 212, 213, 214, and 215 in this picture denote the estimated locations of the five facial landmarks at a previous stage (i.e. stage t−1), respectively. These estimated locations depict the estimated facial shape of a previous stage.

The goal of the training is to find an appropriate regression function for each stage to adjust the estimated facial shape of a previous stage to be closer to the ground truth facial shape. For example, in the top-right picture 25 shown in FIG. 2, the dots 201, 202, 203, 204, and 205 still denote the ground truth locations of the five facial landmarks, respectively, while the dots 221, 222, 223, 224, and 225 in this picture denote the adjusted locations of the five facial landmarks at the current stage (i.e. stage t), respectively. As shown, the adjusted locations are closer to the ground truth locations than the locations of a previous stage.

As mentioned above, in some embodiments, the regression function can be expressed by the combination of a feature mapping function and a linear projection matrix. In such embodiments, the training of the regression function can be divided into two steps.

First, as indicated by block 22 in FIG. 2, a set of local feature mapping functions can be learned. Each of the local feature mapping functions is learned independently from a local region around an associated facial landmark. Various regression approaches can be employed to learn the local feature mapping functions. In some embodiments, to learn each local feature mapping function, ensemble trees based regression can be used to obtain a binary feature which is represented by a binary sequence, as indicated by block 23 in FIG. 2.

Thereafter, these local feature mapping functions can be organized into a feature mapping function. Given the feature mapping function, a global projection matrix can be learned by e.g. a linear regression based on the whole face region, as indicated by block 24 in FIG. 2. The lower part of FIG. 2 illustrates the testing phase for a corresponding stage (i.e. stage t) of the shape regression. In the testing phase, the learned feature mapping function and the learned global projection matrix can be used directly to estimate the facial shape of the current stage.

In the bottom-left picture 26 shown in FIG. 2, the dots 231, 232, 233, 234, and 235 denote the estimated locations of the five facial landmarks at a previous stage (i.e. stage t−1), respectively. These estimated locations depict the estimated facial shape of a previous stage. A local region around each of the five facial landmarks is mapped to a local feature according to the learned local feature mapping function. In one embodiment, all obtained local features are concatenated to generate a single feature, which can be referred to as a global feature for convenience and indicated by block 27 in FIG. 2. Then, the learned global projection matrix can be applied on the global feature to obtain an incremental facial shape for the current stage, which can be used together with the facial shape of a previous stage to generate an estimated facial shape for the current stage. In the bottom-right picture 28 shown in FIG. 2, the dots 241, 242, 243, 244, and 245 denote the estimated locations of the five facial landmarks at the current stage (i.e. stage t), respectively. As shown, the estimated locations are closer to the ground truth locations than the locations of a previous stage.

For purpose of illustration, take the shape increment in Equation (1) as an example to further detail the process of face alignment. Those skilled in the art could appreciate that other equations would be possible.

As shown in Equation (1), both the feature mapping function $\Phi^t$ and the global projection matrix $W^t$ are unknown. In the training phase, for each facial landmark, a local mapping function can be learned by independently regressing the facial landmark, in a corresponding local region. Then, all of the local mapping functions may be concatenated to form the feature mapping function. The global projection matrix can be learned by e.g. a linear regression. In the testing phase, the learned feature mapping function and the global projection matrix are plugged into Equation (1) to get the desired regression output.

The regression target for learning a local feature mapping function (e.g. $\phi_l^t$ for the lth facial landmark) is the ground true shape increment $\Delta\hat{S}$. Many appropriate metrics can be employed to evaluate the regression target. In some embodiments, the regression target is to minimize the distance between the truth offset of the lth facial landmark in a training sample and an estimated offset of the lth facial landmark in the training sample. The distance can be represented by various manners, such as Euclidean distance, Manhattan distance, Chebyshev distance, etc. In one embodiment, the distance can be expressed as below:

$$\min_{w_l^t, \phi_l^t} \sum_{i=1}^{N} \left\| \pi_l \circ \Delta\hat{S}_i^t - w_l^t \phi_l^t(I_i, S_i^{t-1}) \right\|_2, \quad (2)$$

where $\pi_l \circ$ an operator taking two elements (2l−1,2l) from the vector $\Delta\hat{S}_i$, $\pi_l \circ \Delta\hat{S}_i$ stands for the truth 2-Dimension-offset (2D-offset) of the lth facial landmark in the ith training sample, and N is the number of training samples. $w_l^t$ is a "local" linear regression matrix for mapping the learned features $\phi_l^t$ to the target offset. It is a 2-by-D matrix, where D is the dimension of feature mapped by $\phi_l^t$.

In some embodiments, the local feature mapping function may generate a binary local feature for a facial landmark. One implementation of the local feature mapping function is based on random forest, which will be described with reference to FIG. 3 hereinafter. Those skilled in the art should appreciate that other algorithms, such as Convolutional Neural Network, may also be used as the local mapping function.

All of the learned local mapping functions may be concatenated to form the feature mapping function. It should be noted that, after learning a local feature mapping function, both a local feature mapping function and a local linear regression matrix can be obtained. In some embodiments, all learned local linear regression matrices may be discarded. Instead, only the learned feature mapping function is kept to jointly fit a new global projection matrix.

Given the feature mapping function, the global projection matrix can be learned. Various regression methods including linear or non-linear regressions can be used to learn the global projection matrix. The regression target for learning a global projection matrix is the ground true shape increment. Also, many objective functions can be designed as the regression target, such as minimizing the difference between the final output shape and the ground truth shape, minimizing difference of the parameters of a parameterized shape model. In one implementation, the global projection matrix can be learned by a linear regression. One method for linear regression is to minimize an objective function of which the following is one example:

$$\min_{W^t} \sum_{i=1}^{N} \left\| \Delta \hat{S}_i^t - W^t \Phi^t(I_i, S_i^t) \right\|_2 + \lambda \|W^t\|_2, \tag{3}$$

where the first term is the regression target, the second term is an L2 regularization on $W^t$, and $\lambda$ controls the regularization strength. The regularization is an optional term, which is introduced in order to avoid overfitting due to the high dimensionality of the features. For example, for 68 facial landmarks, the dimensionality of the feature mapped by the feature mapping function could be 100K+. The above exemplary objective function is quadratic with respect to the global projection matrix, and thus a global optimum of the global projection matrix can always be reached.

As shown in the lower part of FIG. 2, in the testing phase, the learned feature mapping function and the global projection matrix are plugged into Equation (1) to get the desired regression output. First, with respect to the predicted facial shape from the previous stage, i.e., the position of each facial landmark, a learned local feature mapping function is applied to a local region around the position of an associated facial landmark independently to obtain a local feature. In some embodiments, all of the local features are concatenated to form a high-dimensional global feature. Then, a learned global projection matrix is applied on the concatenated global feature in order to generate an incremental facial shape and then obtain an estimated facial shape of the current stage. The bottom-left image shows the predicted facial shape from the previous stage, which is represented by five white dots. The bottom-right image shows the facial shape predicted at the current stage, which is closer to the truth facial shape than the previous stage. This predicted facial shape can then be used as an input to another stage where again the position of each facial landmark is applied to a local region around the facial landmark to obtain the local feature and the local features concatenated or organized together to obtain another improved and incremental estimation of the facial shape.

Figure 3:
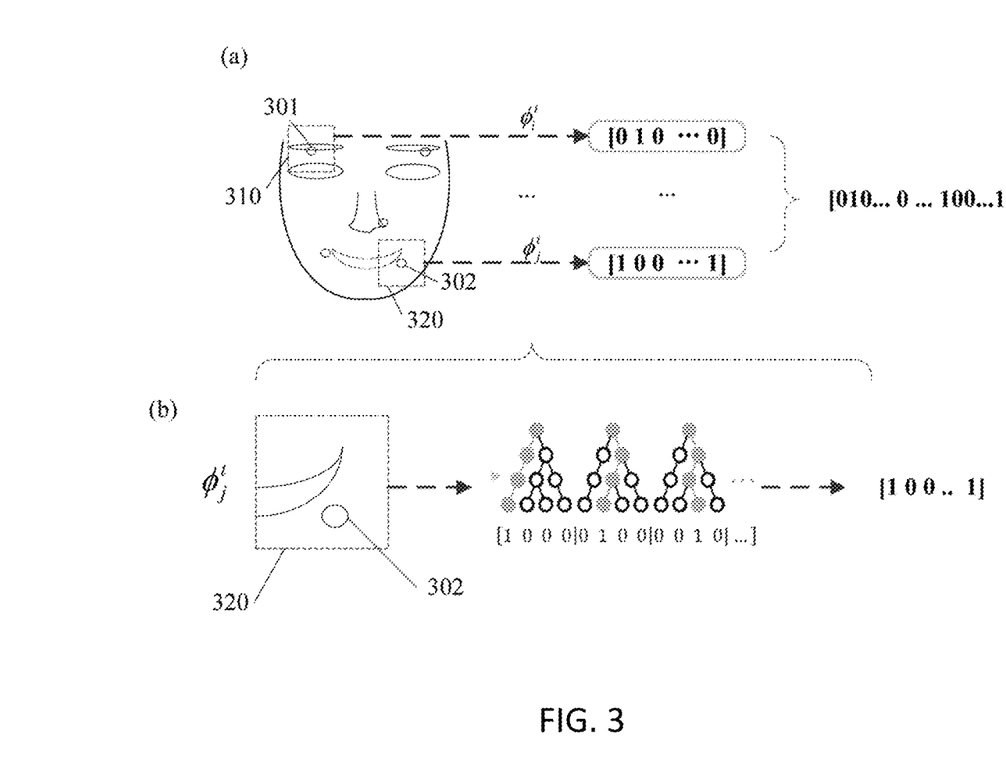
FIG. 3 shows one implementation of the local feature mapping function.

As described above, the local feature mapping function can be learned by various current known or future developed manners, such as random forest, Convolutional Neural Network, etc. For illustration, FIG. 3 shows one implementation of the local feature mapping function. It is to be understood that this is only for the purpose of illustration, without suggesting any limitations on the subject matter described herein.

The sub-graph (a) of FIG. 3 exemplarily illustrates that the local feature mapping function encodes a corresponding local region into a local binary feature. For simplicity, only two local regions are shown for illustration. As shown, a dashed box 310 around a facial landmark 301 (i.e., the left eye) refers to a local region, which is mapped to a local binary feature for example [010 . . . 0] according to an associated local feature mapping function. Another dashed box 320 around another facial landmark 302 (i.e., the right corner of the mouth) refers to another local region, which is mapped to a local binary feature for example [100 . . . 1] according to its associated local feature mapping function. Then, all of the obtained local binary features can be concatenated to form a high-dimensional binary feature, for example [010 . . . 0 . . . 100 . . . 1].

The sub-graph (b) of FIG. 3 illustrates using random forest as the local mapping function. Random forest is an ensemble learning method for classification or regression that operate by constructing a multitude of decision trees at training time and outputting regression target or class label by combining the output of individual trees. The output of the random forest, i.e., the extracted or obtained binary feature can indicate whether the input image contains some local patterns or not. In other words, the extracted binary feature can indicate whether it matches some local pattern, such as eyes, nose, corners of the mouth, etc.

In the forest, each decision tree includes a plurality of nodes, which may include one or more split nodes and/or one or more leaf nodes. The split node tests an image feature to decide whether to branch to left or right, and the leaf node is associated with continuous prediction for the regression target. In one embodiment, where point estimation under Gaussian assumption is used, each leaf node may be associated with a 2-Dimensional (2D) continuous vector obtained through training.

During testing, a sample traverses the trees until it reaches a few leaf nodes. The prediction output of a random forest is the summation of all associated outputs of all leaf nodes. Suppose the total number of leaf nodes is D, the output for a given test sample can be rewritten as:

$$w_l^t \phi_l^t(I_i, S_i^t), \tag{4}$$

where $w_l^t$ is a 2-by-D matrix whose each column is the 2D continuous vector associated with the corresponding leaf node, and $\phi_l^t$ is a D-dimension binary vector. For each element in $\phi_l^t$, it is set to 1 if the test sample reached the corresponding leaf node or zero otherwise. Thus, $\phi_l^t$ is a highly sparse binary vector. The number of non-zero elements in $\phi_l^t$ is equivalent to the number of trees in the forest.

It is seen that the regression forest can be interpreted as a binary and non-linear feature mapping followed by a linear regression. $\phi_l^t$ encodes a local region of a facial landmark and tests whether a sample has some certain patterns or not. $w_l^t$ is a linear coefficient for the prediction. They are learned jointly by the forest learning. Based on this interpretation, the learning of a random forest can be viewed as minimizing the same objective defined in Equation (2) in a discriminative manner. In other words, the random forest can be viewed as a local feature mapping function which analyzes a local region around a facial landmark and encodes it to a local feature. The local feature can indicate whether a local pattern is contained in the local region.

It should be noted that, in some embodiments, all learned local linear regression matrices may be discarded. Instead, only the learned feature mapping function is kept to jointly fit a new global projection matrix. Performance can be significantly improved by this kind of "refitting" or "transfer learning" due to the following reasons. On one hand, the local linear projection induced by random forest is noisy because the number of training samples reached into a leaf node may be insufficient or the point estimation is inappropriate for some nodes. On the other hand, the global regression can effectively enforce a global shape constraint, making the shape regression robust to occlusion and ambiguous local appearance.

It should be also noted that, in the forest learning, only the pixel features in a local region around the estimated location of each facial landmark are used. In some further embodiments, the size of the local region may be automatically set to a suitable value for each stage.

It can be understood that, the size of the local region will depend on the distribution of offset of each facial landmark. In some embodiments, the offset can be represented by a Gaussian distribution. If the offset is scattered widely, i.e., the standard deviation of the offset is large, then a larger size of the local region should be used; otherwise a small one. The local region can be of any suitable shape, including but not limited to a circle, a square, a rectangle, a triangle, and so on. When the shape of a local region is a circle, the size of a local region can be represented by a radius r of the local region which is centered on the position of an associated facial landmark predicted at the previous stage.

Studies show that the suitable radius r for each stage is strongly and almost linearly proportional to the standard deviation of the offset. Thus, in one embodiment, the size of a local region may decrease as the stage of the shape regression increases. In one implementation, the size of a local region may be reduced at a constant rate as the stage of the shape regression increases. In another implementation, the size of a local region can be determined for each stage independently. For example, at each stage, a suitable size can be searched from a plurality of discrete size values by cross-validation on a validation set, e.g., a small fraction of training data.

Figure 4:
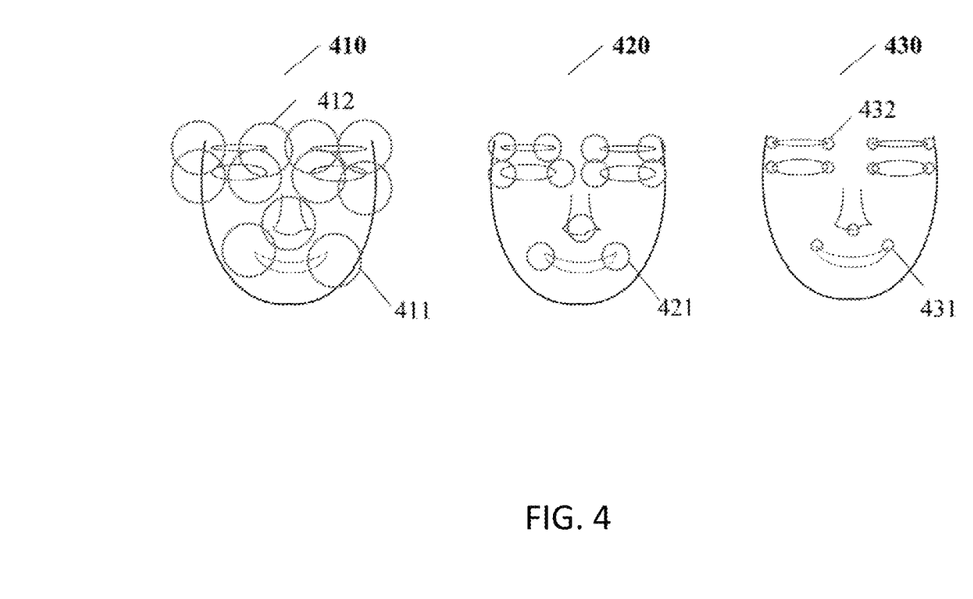
FIG. 4 shows the local region size suitable for different stages.

FIG. 4 shows one example of the local region size suitable for different stages. Pictures 410, 420, and 430 illustrate the suitable size of a local region for stage 1, stage 3, and stage 5, respectively. As an example, the circle 411 denotes a local region around a facial landmark (e.g., the right corner of the mouth) in stage 1, the circle 421 denotes a local region around the same facial landmark (i.e., the right corner of the mouth) in stage 3, and the circle 431 denotes a local region around the right corner of the mouth in stage 5. As shown, the size of the local region gradually shrinks from early stage to later stage. In the early stage, the size of the local region could be set large enough to cover one or more landmarks. The feature learned from one landmark can indeed facilitate the locating of its neighboring landmarks in a same local region. As shown in the picture 410 of FIG. 4, the local region denoted by the circle 412 around the inner end of the left eyebrow also covers a facial landmark of the inner corner of the left eye. The relative location between the two facial landmarks can increase the rate of convergence of the regression. In the later stage, the regression can fine-tune each landmark in a very small region. As shown in the picture 430 of FIG. 4, the local region denoted by the circle 432 around the inner end of the left eyebrow only covers the facial landmark of the inner end of the left eyebrow. The most useful information for the fine-tuning is likely from a small region around each landmark.

Figure 5:
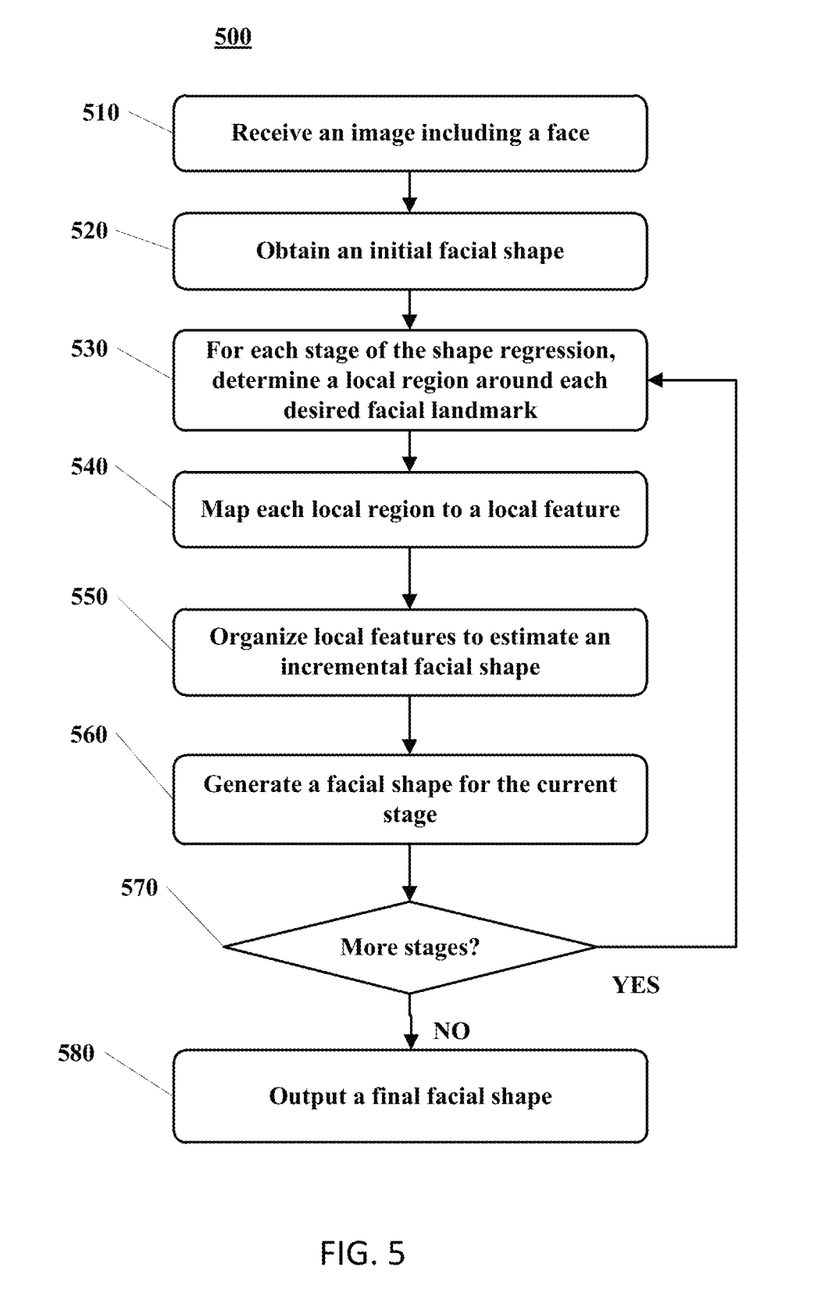
FIG. 5 is a flow diagram showing example steps for implementing face alignment via regressing local features.

FIG. 5 is a flow diagram showing example steps for implementing face alignment via regressing local features. It is to be understood that the steps are not necessarily performed in the order shown in FIG. 5. Instead those steps may be performed in any other suitable orders or in parallel.

The method 500 begins with step 510 where an image including a face is received. The image can come from various sources, such as a camera, a photo gallery and so on.

At step 520, an initial facial shape corresponding to the face within the image can be obtained. In some embodiments, the initial facial shape may be predetermined and received with the image. In some other embodiments, an initial facial shape corresponding to the face within the image could be determined or detected according to any known approach or algorithm or may be provided as a predetermined general initial starting face shape that is generalized to cover all or a set of probable face shapes or selected from a plurality of generalized initial face shapes using any suitable initial selection technique. Then, beginning with the initial facial shape, a shape regression can be performed. As described previously, the facial shape can be represented by a multiple of facial landmarks. In this regard, the initial facial shape has given a coarse location for each desired facial landmark.

At step 530, for a stage t of the shape regression, a local region around each facial landmark in the image is determined. In other words, pixels around each facial landmark may be selected as the local region. The shape of the local region can be any suitable predetermined shape, such as a circle, a square, etc. The size of the local region may change and can be predetermined for each stage. In one implementation, the size of a local region may be reduced at a constant rate as the stage of the shape regression increases. In another implementation, the size of a local region can be determined for each stage independently. For example, at each stage, a suitable size can be searched from a plurality of discrete size values by cross-validation on a validation set, e.g., a small fraction of training data.

At step 540, each local region for each facial landmark is then mapped independently to a local facial feature. In some embodiments, the mapping of a local region in the image to a facial feature is based on a feature mapping function including a set of independent local feature mapping functions. Each local feature mapping function in the set is associated with a facial landmark. In some further implementations, a local feature mapping function encodes a local region around an associated facial landmark into a local binary feature represented by a binary sequence.

In some implementations, each local feature mapping function may be obtained by regressing an associated facial landmark independently in a local region of the facial landmark. As described with reference to FIG. 3, in one implementation, a random forest may be used as the local feature mapping function. Then, a set of local binary features may be obtained.

At step 550, the obtained local features can be organized or associated together and the correlation among them can be explored to estimate the incremental facial shape for the current stage. As mentioned previously, the organization of the local features can be accomplished in many appropriate manners. In one implementation, a global projection is performed based on the local features of multiple facial landmarks as obtained at step 540, in order to predict a facial shape increment for the stage t. In some implementations, the global projection may be performed by: concatenating the local binary features of the multiple facial landmarks as obtained at step 540 into a high-dimensional binary feature. Since the high-dimensional binary feature has incorporated the local binary features of the multiple facial landmarks, it can be referred to as a global binary feature for short. Then, a global projection can be performed on the concatenated global binary feature according to a global projection matrix.

In some implementations, the global projection matrix may be trained by a linear regression based on the trained local feature mapping functions on the entire region of the face, which has been detailed with reference to FIG. 2.

At step 560, having obtained a facial shape increment for the stage t, a facial shape of the stage t can be generated based on the predicted facial shape increment and a facial shape of a previous stage t−1.

Then, at step 570, it can be determined whether the shape regression should be ended based on some termination condition. In some implementations, termination conditions may include that a certain number (e.g., a predetermined threshold in the range of 3 to 7 or more) of stages have been performed, or a certain condition (e.g., the facial shape increment is smaller than a threshold) is met, or the combination thereof. The process goes to step 580, where a final facial shape can be output. The final facial shape is the facial shape predicted at the last stage of the shape regression.

If the termination condition is not met, the process returns back to step 530 to prepare for the next stage. More specifically, a local region around each facial landmark in the image is determined. The local region is determined based on the facial shape predicted at step 560, the previous stage to the new stage process.

Figure 6:
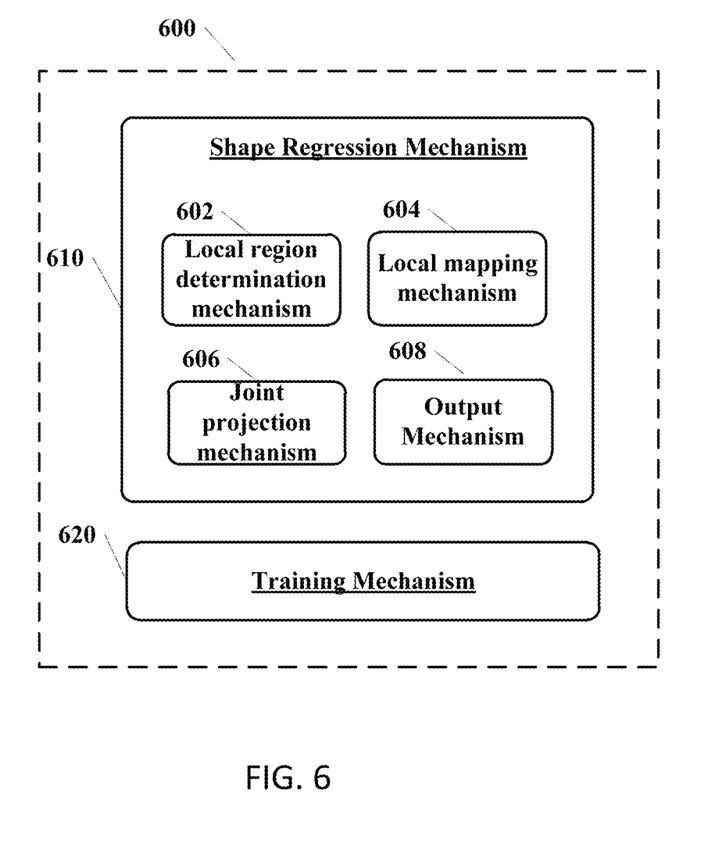
FIG. 6 illustrates a block diagram of a system for implementing face alignment via regressing local features.

FIG. 6 illustrates a block diagram of a system 600 for implementing face alignment via regressing local features.

As shown, the system 600 comprises a shape regression mechanism 610, which is configured to predict a facial shape in a cascaded manner.

The shape regression mechanism 610 includes a local region determination mechanism 602, which is configured to determine a local region around each facial landmark in a facial image. The shape of the local region can be any suitable predetermined shape, such as a circle, a square, etc. Furthermore, the size of the local region may change and can be predetermined for each stage. Generally, the size of the local region may decrease as the stage of the shape regression increases. In one implementation, the size of a local region may be reduced at a constant rate as the stage of the shape regression increases. In another implementation, the size of a local region can be determined for each stage independently. For example, at each stage, a suitable size can be searched from a plurality of discrete size values by cross-validation on a validation set, e.g., a small fraction of training data.

The shape regression mechanism 610 further includes a local mapping mechanism 604, which is configured to, for each stage of the shape regression, extract a local feature of each desired facial landmark from a local region around the facial landmark in a facial image independently. The extracting of the local feature from the local region in the image can be accomplished in many appropriate manners. One implementation of the local feature extracting or mapping is using a feature mapping function including a set of independent local feature mapping functions. Each local feature mapping function is associated with a facial landmark and maps a local region of the image around the associated facial landmark to a local feature.

The shape regression mechanism 610 further includes a joint projection mechanism 606, which is configured to, for each stage of the shape regression, perform a joint projection based on two or more local features of multiple facial landmarks as obtained from the local mapping mechanism 604, to predict a facial shape increment. During the joint projection, the extracted local features can be organized or associated and the correlation among them can be explored to estimate an incremental facial shape. The organization of the local features can be accomplished in many appropriate manners. In one implementation, all the extracted local features can be organized together according to a global projection to predict an incremental facial shape at that stage. In another implementation, the local features can be divided into several groups (for example, two groups, each for a half of a face), and each group is associated with a joint projection. In yet another implementation, only some of the local features (for example, some salient feature, such as eyes, nose, mouth, etc.) are used for a joint projection.

The shape regression mechanism 610 further includes an output mechanism 608, which is configured to generate a facial shape of a current stage based on the predicted facial shape increment and a facial shape of a previous stage.

In some embodiments, the local mapping mechanism 604 may be configured to encode a local region around a facial landmark into a local binary feature according to a local feature mapping function associated with the facial landmark.

In some embodiment, the global projection mechanism 606 may be configured to perform a global projection by: concatenating the local binary features of the multiple facial landmarks into a binary feature; and performing a global projection on the concatenated binary feature according to a global projection matrix.

The system 600 may further comprise a training mechanism 620, which is configured to train each local feature mapping function by regressing each associated facial landmark independently in a local region of the facial landmark. Specifically, a random forest may be used as the local feature mapping function. The training mechanism 620 may be further configured to train the global projection matrix by a linear regression based on the trained local feature mapping functions on a whole region of the face.

In should be noted that FIG. 6 merely illustrates various functional modules or mechanisms in the system 600 in a logical sense. The functions in practice may be implemented using any suitable software and hardware means/circuits etc. Thus, the embodiments are generally not limited to the shown structures of the system 600 and the functional modules. Hence, the previously described exemplary embodiments may be realized in many ways. For example, one embodiment includes a computer-readable medium having instructions stored thereon that are executable by the control or processing unit for executing the method steps in the system 600. The instructions executable by the system 600 and stored on the computer-readable medium perform the method steps of the system 600 as set forth previously.

In some embodiments, the method for the shape regression mechanism can be embodied as shown in Table 1.

TABLE 1 initialize facial shape $S^0$
for t =1 to T
    for l=1 to L
        improve the radius $r^t$ of a local region
        encode a local region of the lth facial landmark into a local
        feature according to a local feature mapping function $\phi_l^t$
    concatenate L local features into a concatenated feature $\Phi^t(I,S^{t-1})$ TABLE 1-continued perform a global projection on the concatenated feature to obtain a facial shape increment
$\Delta S^t = W^t \Phi^t(I, S^{t-1})$
generate a facial shape predicted at current stage $S^t = \Delta S^t + S^{t-1}$
output the final facial shape $S^T$ Alternatively, or in addition, the functionality described herein, e.g., the shape regression mechanism 610, the sub-mechanisms 602, 604, 606, and 608 included therein, and the training mechanism 620 can be performed, at least in part, by one or more hardware logic components. For example, and without limitation, illustrative types of hardware logic components that can be sued include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Experiments show that the proposed shape regression based on local features can achieve better accuracy and speed. This high performance makes it especially attractive for applications on mobile and embedded devices.

Figure 7:
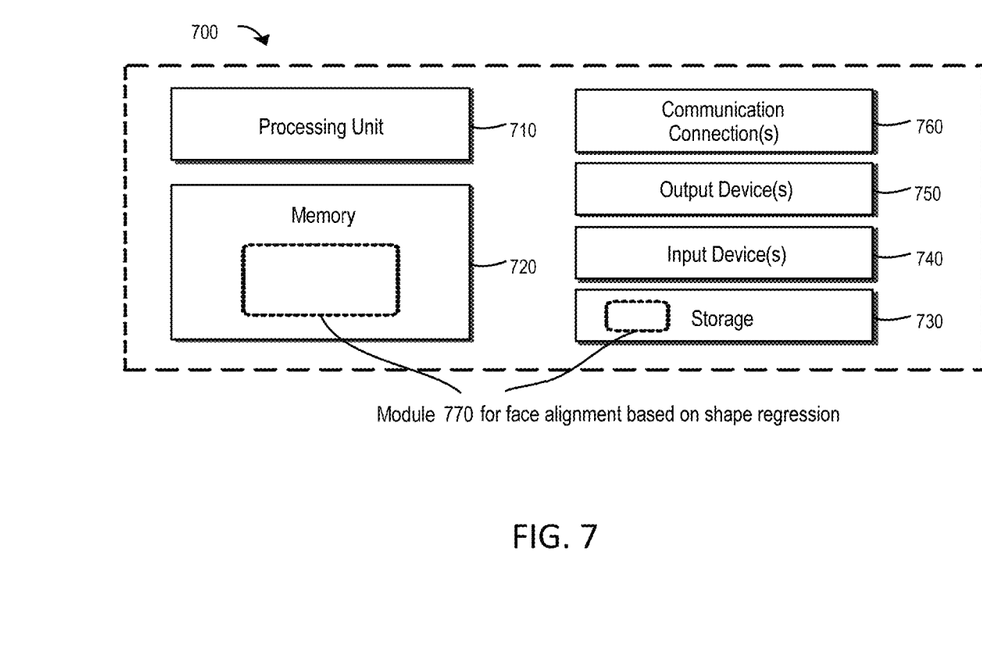
FIG. 7 shows an illustrative example of a computing environment into which various aspects of the present disclosure may be implemented.

FIG. 7 illustrates an example of a computing environment 700 in which one or more embodiments of the subject matter described may be implemented. The computing environment 700 is only one example of a suitable computing environment and in not intended to suggest any limitation as to scope of use or functionality of the subject matter described herein. Neither should the computing environment 700 is interpreted as having any dependency or requirement relating to any one or combination of components illustrated in the exemplary computing environment 700.

The subject matter described herein is operational with numerous other general-purpose or special-purpose computing environments or configurations. Examples of well known computing systems, environments, and/or configurations that may be suitable for use with the disclosure include, but are not limited to: personal computers, server computers, hand-held or laptop devices, tablet devices, mobile and embedded devices, multiprocessor systems, microprocessor-based systems, set top boxes, programmable consumer electronics, network PCs, minicomputers, mainframe computers, distributed computing environments that include any of the above systems or devices, and the like.

With reference to FIG. 7, the computing environment 700 includes at least one processing unit (or processor) 710 and a memory 720. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory), or some combination of the two. The memory 720 stores at least a part of instructions for a module 770 for face alignment via shape regression based on local features.

A computing environment 700 may have additional component or features. In the example shown in FIG. 7, the computing environment 700 includes storage 730, one or more input devices 740, one or more output devices 750, and one or more communication connections 760. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 730 may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment 700. The storage 730 may store at least a part of instructions for the module 770.

It should be noted that, the module 770 may take the form of an entirely hardware implementation, an entirely software implementation (including firmware, resident software, micro-code, etc.) or an implementation combining software and hardware aspects that may all generally be referred to herein as a "module" or "mechanism". Furthermore, aspects of the module 770 may take the form a computer program product embodied in one or more computer readable medium(s) having computer readable program instructions embodied thereon. The instructions for the module 770 may be contained entirely in the memory 720, entirely in the storage 730, or partly in the memory 720 and partly in the storage 730 in communication with the memory 730.

The input device(s) 740 may be one or more of various different input devices. For example, the input device(s) 740 may include a user device such as a mouse, keyboard, a camera, trackball, etc. The input device(s) 740 may implement one or more natural user interface techniques, such as speech recognition, touch and stylus recognition, recognition of gestures in contact with the input device(s) 740 and adjacent to the input device(s) 740, recognition of air gestures, head and eye tracking, voice and speech recognition, sensing user brain activity, and machine intelligence. As other examples, the input device(s) 740 may include a scanning device; a network adapter; a CD/DVD reader; or another device that provides input to the computing environment 700. The output device(s) 750 may be a display, printer, speaker, CD/DVD-writer, network adapter, or another device that provides output from the computing environment 700. The input device(s) 740 and output device(s) 750 may be incorporated in a single system or device, such as a touch screen, a virtual reality system, or a wearable computing device including a head mounted device.

The communication connection(s) 760 enables communication over a communication medium to another computing entity. Additionally, functionality of the components of the computing environment 700 may be implemented in a single computing machine or in multiple computing machines that are able to communicate over communication connections. Thus, the computing environment 700 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments of the subject matter can be described in the general context of computer-readable media, which may be storage media or communication media. Computer-readable storage media are any available storage media that can be accessed within a computing environment, but the term computer-readable storage media does not refer to transitory propagating signals per se or to other signals per se. By way of example, and not limitation, with the computing environment 700, computer-readable storage media include memory 720, storage 730, and combinations thereof.

Embodiments of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the disclosure is susceptible to various modifications and alternative constructions, certain illustrated embodiments thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the invention. Aspects of any of the embodiments described above may be combined with aspects of any of the other embodiments described to form further embodiments without losing the effect sought.

What is claimed is:

1. A method for face alignment implemented at least in part by a computer comprising:
   receiving an image including a face; and
   estimating, by a processor, a facial shape in the image with shape regression, wherein the facial shape is represented by a multiple of facial landmarks, the estimating including, for each stage in the shape regression:
      extracting a local feature from a local region around each facial landmark in the image independently, the extracting comprising mapping a local region around a facial landmark into a local feature according to a local feature mapping function associated with the facial landmark, the local feature mapping function encoding the local region into a local binary feature;
      organizing two or more of the local features based on correlations among the facial landmarks to predict a facial shape increment;
      determining whether the predicted facial shape increment is less than a threshold; and
      based on a determination that the predicted facial shape increment is greater than the threshold:
         extracting a set of second local features around each facial landmark in the image independently, the extracting comprising mapping a second local region around a second facial landmark into a second local feature according to the local feature mapping function associated with the second facial landmark, the local feature mapping function encoding the second local region into the local binary feature;
         organizing two or more of the second local features based on correlations among the second facial landmarks to predict a second facial shape increment; and
         based on a determination that the second predicted facial shape increment is less than the threshold, generating a final facial shape.

2. The method of claim 1, wherein organizing two or more of the local features comprises:
   concatenating the local features of the multiple facial landmarks into a global feature; and
   performing a global projection on the global feature according to a global projection matrix.

3. The method of claim 1, further comprising training each local feature mapping function by regressing each associated facial landmark independently in a local region of the facial landmark.

4. The method of claim 2, further comprising training the global projection matrix by a linear regression based on trained local feature mapping functions on a whole region of the face.

5. The method of claim 3, wherein a random forest is used as the local feature mapping function.

6. The method of claim 1, wherein a size of a local region of a facial landmark decreases as the stage of the shape regression increases.

7. A computer storage device having computer-executable instructions, which when executed perform actions for face alignment comprising:
   receiving an image including a face; and
   estimating a facial shape in the image with shape regression, wherein the facial shape is represented by a multiple of facial landmarks, the estimating including, for each stage in the shape regression:
      extracting a local feature from a local region around each facial landmark in the image independently, the extracting comprising mapping a local region around a facial landmark into a local feature according to a local feature mapping function associated with the facial landmark, the local feature mapping function encoding the local region into a local binary feature;
      organizing two or more of the local features based on correlations among the facial landmarks to predict a facial shape increment;
      determining whether the predicted facial shape increment is less than a threshold; and
      based on a determination that the predicted facial shape increment is greater than the threshold:
         extracting a set of second local features around each facial landmark in the image independently, the extracting comprising mapping a second local region around a second facial landmark into a second local feature according to the local feature mapping function associated with the second facial landmark, the local feature mapping function encoding the second local region into the local binary feature;
         organizing two or more of the second local features based on correlations among the second facial landmarks to predict a second facial shape increment; and based on a determination that the second predicted facial shape increment is less than the threshold, generating a final facial shape.

8. The computer storage device of claim 7, wherein organizing two or more of the local features comprises:
concatenating the local features of the multiple facial landmarks into a global feature; and
performing a global projection on the global feature according to a global projection matrix.

9. The computer storage device of claim 7, the actions further comprising training each local feature mapping function by regressing each associated facial landmark independently in a local region of the facial landmark.

10. The computer storage device of claim 8, the actions further comprising training the global projection matrix by a linear regression based on trained local feature mapping functions on a whole region of the face.

11. The computer storage device of claim 9, wherein a random forest is used as the local feature mapping function.

12. The computer storage device of claim 7, wherein a size of a local region of a facial landmark decreases as the stage of the shape regression increases.

13. In a computing environment, a system for face alignment comprising:
a processor;
a shape regression mechanism, including a local mapping mechanism configured to, for each stage of the shape regression:
extract a local feature from a local region around each facial landmark in a facial image independently; and
map a local region around a facial landmark into a local feature according to a local feature mapping function associated with the facial landmark where the local feature mapping function encodes the local region into a local binary feature; and
a joint projection mechanism configured to, for each stage of the shape regression, organize two or more of the local features based on correlations among the facial landmarks to predict a facial shape increment; and
an output mechanism configured to cause the processor to, based on a determination that the predicted facial shape increment is greater than the threshold:
extract a set of second local features around each facial landmark in the facial image independently, the extracting comprising mapping a second local region around a second facial landmark into a second local feature according to the local feature mapping function associated with the second facial landmark, the local feature mapping function encoding the second local region into the local binary feature;
organize two or more of the second local features based on correlations among the second facial landmarks to predict a second facial shape increment; and
based on a determination that the second predicted facial shape increment is less than the threshold, generate a final facial shape.

14. The system of claim 13, wherein the joint projection mechanism is configured to organize the local features by:
concatenating the local features of the multiple facial landmarks into a global feature; and
performing a global projection on the global feature according to a global projection matrix.

15. The system of claim 13, further comprising a training mechanism configured to train each local feature mapping function by regressing each associated facial landmark independently in a local region of the facial landmark.

16. The system of claim 15, the training mechanism is further configured to train a global projection matrix by a linear regression based on the trained local feature mapping functions on a whole region of the face.

17. The system of claim 13, wherein a size of a local region of a facial landmark decreases as the stage of the shape regression increases.

18. The method of claim 3, wherein a target of the regression is a distance between a truth offset of a facial landmark and an estimated offset of the facial landmark.

19. The computer storage device of claim 9, wherein a target of the regression is a distance between a truth offset of a facial landmark and an estimated offset of the facial landmark.

20. The system of claim 13, wherein each local feature mapping function is trained by regressing each associated facial landmark independently in a local region of the facial landmark, wherein a target of the regression is a distance between a truth offset of a facial landmark and an estimated offset of the facial landmark.

* * * * *